United States Patent [19]

Zalewski et al.

[11] Patent Number: 5,704,863
[45] Date of Patent: Jan. 6, 1998

[54] TWO-SPEED TRANSFER CASE WITH ON-DEMAND TORQUE CONTROL HAVING A COUPLING PUMP AND A SUPPLY PUMP

[75] Inventors: John D. Zalewski, Liverpool; Sankar K. Mohan, Syracuse, both of N.Y.; Carl D. Schleuder, Novi, Mich.; Ellen M. Fanning, Manlius, N.Y.; Timothy M. Burns, Rochester, N.Y.; Douglas Conklin, Oneida, N.Y.

[73] Assignee: New Venture Gear, Inc., Troy, Mich.

[21] Appl. No.: 673,934

[22] Filed: Jul. 1, 1996

[51] Int. Cl.[6] ............................................. F16H 48/30
[52] U.S. Cl. ................... 475/88; 475/206; 180/247; 192/85 AA
[58] Field of Search ................... 475/86, 88, 93, 475/99, 204, 205, 206; 180/247, 248; 192/57, 85 AA, 35

[56] References Cited

U.S. PATENT DOCUMENTS

| | | |
|---|---|---|
| 4,770,280 | 9/1988 | Frost ......................... 180/247 X |
| 5,148,900 | 9/1992 | Mohan ......................... 192/58 C |
| 5,201,820 | 4/1993 | Hamada et al. ............... 180/247 X |
| 5,221,101 | 6/1993 | Okubo et al. ................. 180/247 |
| 5,234,091 | 8/1993 | Kobayashi et al. ............ 475/86 X |
| 5,275,252 | 1/1994 | Sperduti et al. .............. 180/247 X |
| 5,310,388 | 5/1994 | Okcuoglu et al. ............. 475/88 |
| 5,323,871 | 6/1994 | Wilson et al. ................ 180/247 X |
| 5,330,030 | 7/1994 | Eastman et al. .............. 180/247 X |
| 5,358,454 | 10/1994 | Bowen et al. ................ 475/94 |
| 5,456,642 | 10/1995 | Frost ......................... 475/93 |
| 5,536,215 | 7/1996 | Shaffer et al. ............... 475/88 |
| 5,595,214 | 1/1997 | Shaffer et al. ............... 475/88 X |
| 5,611,746 | 3/1997 | Shaffer ...................... 475/88 |

*Primary Examiner*—Khoi Q. Ta
*Attorney, Agent, or Firm*—Harness, Dickey & Pierce, P.L.C.

[57] ABSTRACT

The present invention is directed to an improved power transfer system for use in four-wheel drive vehicles having a transfer case equipped with a torque transfer arrangement that is operable for automatically controlling the drive torque delivered to the front and rear drivelines of the vehicle and establishing an on-demand four-wheel drive mode.

4 Claims, 7 Drawing Sheets

5,704,863

TWO-SPEED TRANSFER CASE WITH ON-DEMAND TORQUE CONTROL HAVING A COUPLING PUMP AND A SUPPLY PUMP

BACKGROUND OF THE INVENTION

The present invention relates to a power transfer system for controlling the distribution of drive torque between the front and rear wheels of a four-wheel drive vehicle.

Due to increased consumer demand for four-wheel drive vehicles, a plethora of different power transfer systems are currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a mode shift mechanism can be selectively actuated by the vehicle operator for directly coupling the non-driven wheels to the driven wheels for establishing a part-time four-wheel drive mode. As will be appreciated, motor vehicles equipped with such a part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770, 280 to Frost.

Alternatively, it is known to use "on-demand" power transfer systems for automatically directing power to the non-driven wheels, without any input or action on the part of the vehicle operator, when traction is lost at the driven wheels. Modernly, the on-demand feature is incorporated into the transfer case by replacing the mode shift mechanism with a speed-sensitive torque transmission device such as, for example, a viscous coupling or a geared traction unit. In particularly, commonly-owned U.S. Pat. No. 5,148,900 to Mohan discloses a viscous coupling that is adapted for use in an on-demand transfer case while commonly-owned U.S. Pat. Nos. 5,358,454 to Bowen and 5,456,642 to Frost disclose geared traction units that are likewise adapted for use in on-demand transfer cases. Furthermore, U.S. Pat. No. 5,310,388 to Okeuogh et al discloses a hydraulic coupling which incorporates a gerotor pump and multi-plate clutch into a common assembly for transferring torque on-demand in response to a speed differential between the driven and non-driven shafts.

As a further variant, some on-demand transfer cases are equipped with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque on-demand to the non-driven wheels. Moreover, the amount of drive torque transferred through the clutch assembly to the non-driven wheels can be varied as a function of specific vehicle dynamics, as detected by the sensor arrangement. One example of such an electronically-controlled on-demand power transfer system is disclosed in commonly-owned U.S. Pat. No. 5,323,871 to Wilson et al. The above-noted Wilson patent also teaches of providing a mode select arrangement which functions to fully actuate and lock-up the clutch assembly when the vehicle operator shifts the transfer case into a part-time four-wheel drive mode. Alternatively, commonly-owned U.S. Pat. Nos. 5,275,252 to Sperduti and 5,330,030 to Eastman disclose electronically-controlled on-demand transfer cases that are equipped with a manually-actuated lock-out mechanism for permitting selection of the part-time four-wheel drive mode.

SUMMARY OF THE INVENTION

It is therefore an object of the present invention to provide an improved power transfer system for use in four-wheel drive vehicles having a transfer case equipped with a torque transfer arrangement that is operable for automatically controlling the drive torque delivered to the front and rear drivelines of the vehicle to establish an on-demand four-wheel drive mode.

As a further object, the transfer case is further equipped with a manually-operable lock-out mechanism for rigidly coupling the front and rear output shafts to establish a part-time four-wheel drive mode.

As an additional object, the on-demand torque transfer arrangement includes a hydraulic pump and a transfer clutch assembled into a hydraulic coupling with the hydraulic pump having a three component gerotor arrangement.

Another object of the present invention is to further equip the transfer case with a dual-speed planetary gear reduction unit for permitting establishment of high-range and low-range speed ratios, with the lock-out mechanism arranged to establish the part-time four-wheel drive mode when the gear reduction unit is shifted into the low-range speed ratio.

BRIEF DESCRIPTION OF THE DRAWINGS

Further objects, features and advantages of the present invention are readily apparent from the following detailed specification and the appended claims which, in conjunction with drawings, set forth the best mode now contemplated for carrying out the invention. Referring to the drawings:

DETAILED DESCRIPTION OF THE INVENTION

Figure 1:
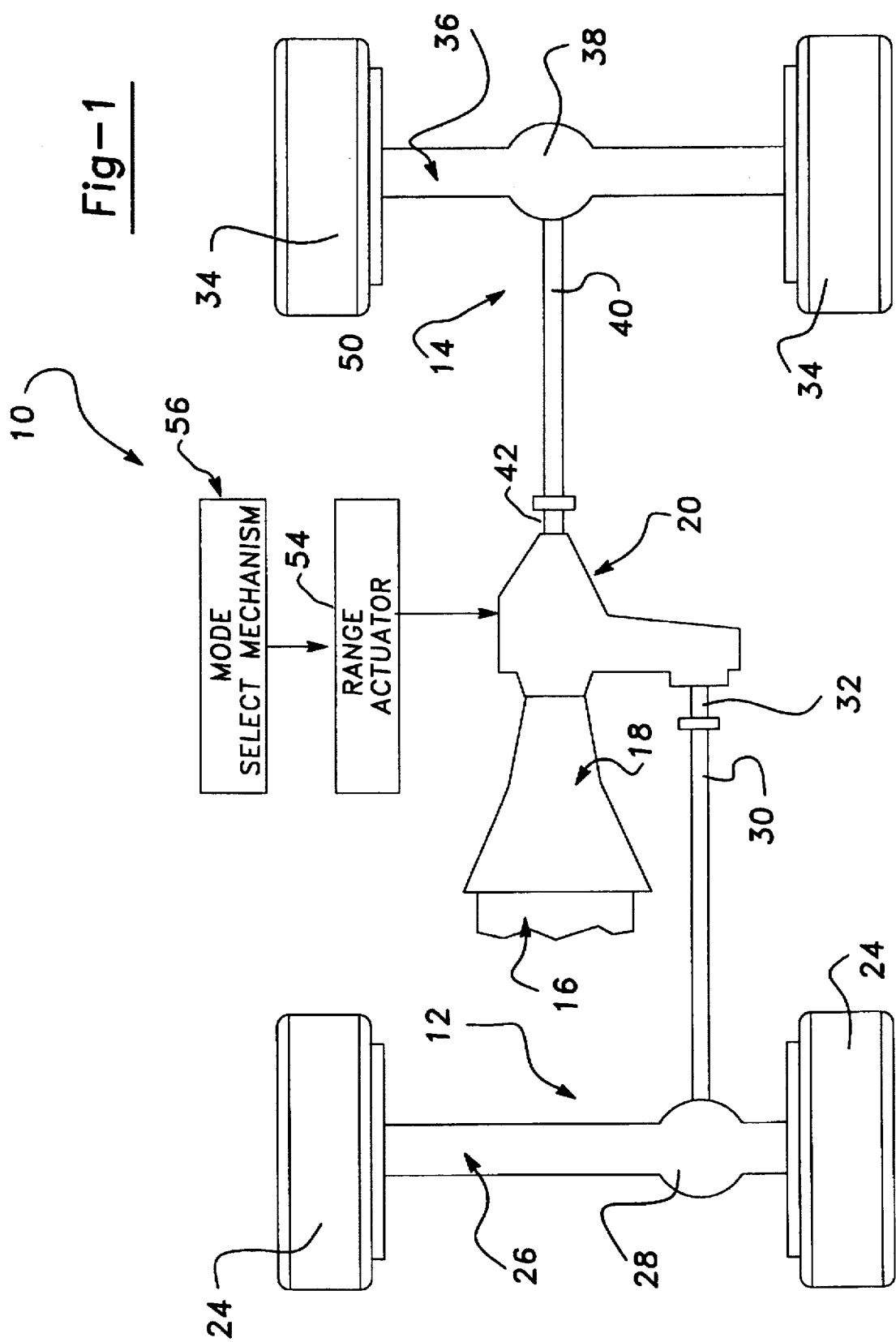
FIG. 1 is a schematic illustration of a four-wheel drive motor vehicle equipped with the transfer case of the present invention.

Referring now to FIG. 1 of the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain includes a transfer case 20 for selectively transmitting drive torque from engine 16 and transmission 18 to front driveline 12 and rear driveline 14. Front driveline 12 includes a pair of front wheels 24 connected at opposite ends of a front axle assembly 26 having a front differential 28 that is coupled to one end of a front prop shaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear prop shaft 40, the opposite end of which is interconnected to a rear output shaft 42 of transfer case 20.

As will be detailed hereinafter with greater specificity, transfer case 20 is equipped with: an input shaft 44 rotatably driven by engine 16; a planetary-type gear reduction unit 46 rotatably driven by input shaft 44 at a reduced speed ratio relative thereto; a range shift mechanism 48 for selectively coupling rear output shaft 42 to either input shaft 44 or gear reduction unit 46; a lock-out mechanism 50 for selectively coupling front output shaft 32 to rear output shaft 42 to establish a "part-time" four-wheel drive mode; and a hydraulic coupling 52 for automatically controlling the torque transferred from rear output shaft 42 to front output shaft 32 for establishing an "on-demand" four-wheel drive mode. Such on-demand torque transfer is accomplished without any input from the vehicle operator in response to the occurrence of a certain level of "interaxle" speed differential between rear output shaft 42 and front output shaft 32. Power transfer system 10 further includes a range actuator 54 for actuating range shift mechanism 48 and a mode select mechanism 56 for permitting the vehicle operator to select one of the available drive modes.

With particular reference now to FIG. 2 through 10, a preferred construction for transfer case 20 will now be described. Transfer case 20 includes a housing assembly 58 which is shown rotatably supporting input shaft 44 via a bearing assembly 60. Input shaft 44 is coupled (i.e., splined) to the output of transmission 18, which is partially shown as transmission output shaft 62, such that both are rotatably driven by engine 16. Planetary gear reduction unit 46 is operably installed between input shaft 44 and rear output shaft 42. Rear output shaft 42 is shown to have its forward end rotatably supported by bearing assembly 64 located within a pilot bore formed in input shaft 58 and its rearward end supported by a bearing assembly 66 from housing 58. Planetary gear reduction unit 46 includes a sun gear 68 mounted to or formed integrally with input shaft 44, a ring gear 70 non-rotatably secured to housing 58, and a carrier assembly 72 having a plurality of pinion gears 74 that are intermeshed with sun gear 68 and ring gear 70. Carrier assembly 72 includes front and rear carrier rings 75 and 76, respectively that are suitably interconnected and between which each pinion gear 74 is rotatably supported. Specifically, each pinion gear 74 is mounted via a suitable bearing assembly 78 on a pinion shaft 80 extending between carrier rings 75 and 76. As such, rotation of input shaft 44 causes carrier assembly 72 to rotate relative thereto at the reduced speed ratio.

Figure 2:
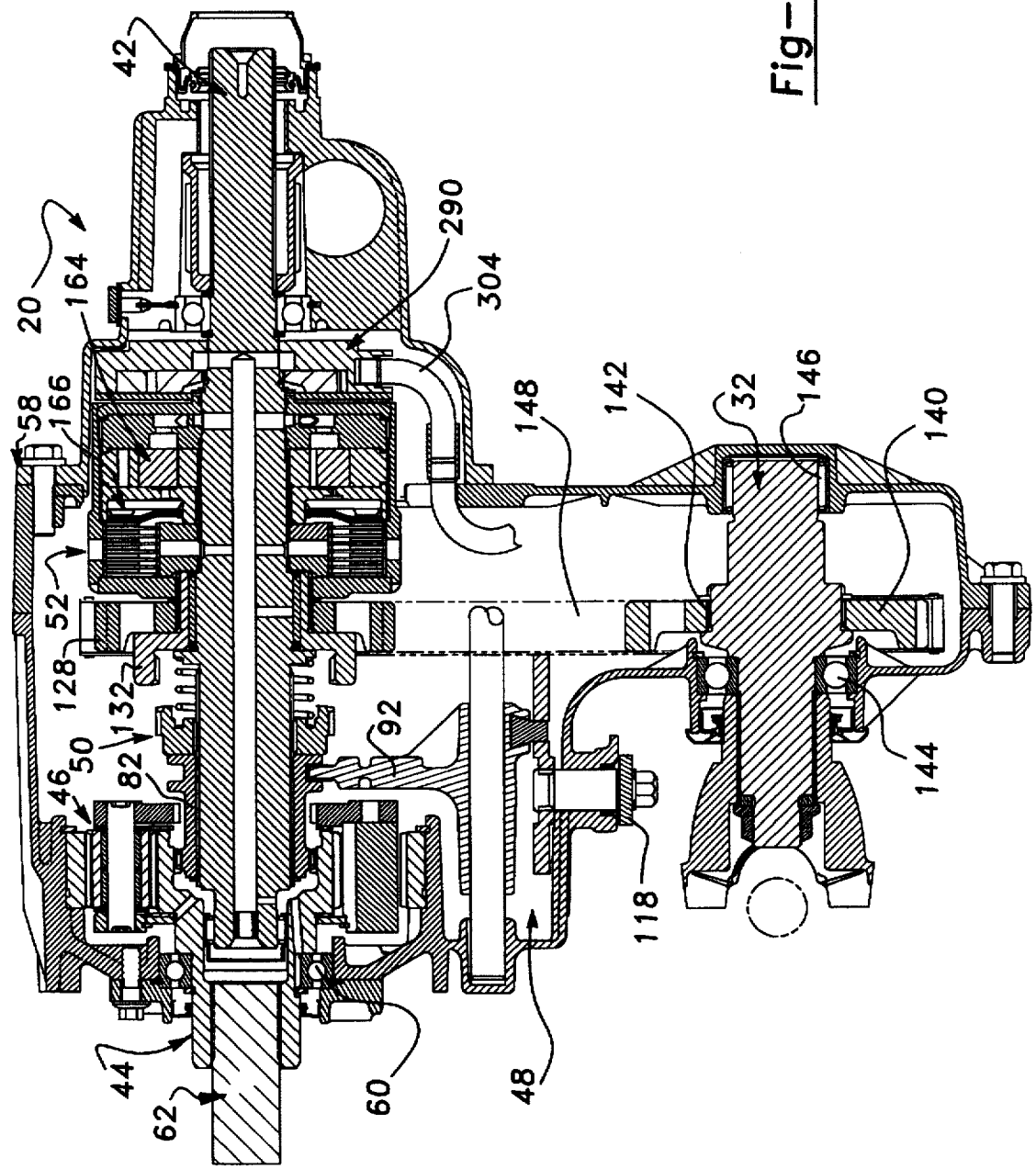
FIG. 2 is a cross-sectional view of the transfer case according to the preferred embodiment of the present invention.
Figure 3:
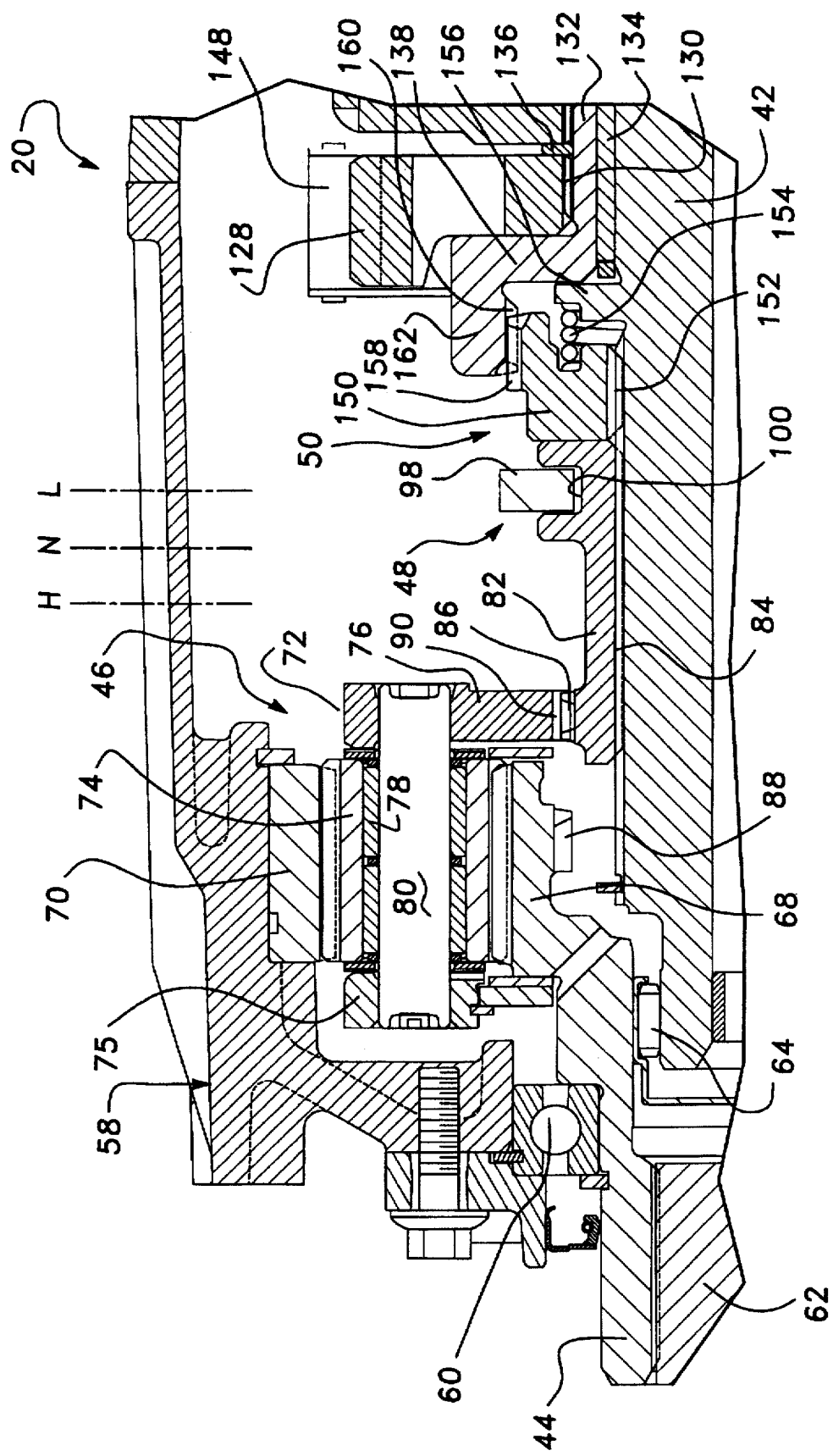
FIG. 3 is an enlarged fragmentary view of FIG. 2 showing the components of the planetary gear reduction unit and lock-out mechanism in greater detail.
Figure 4:
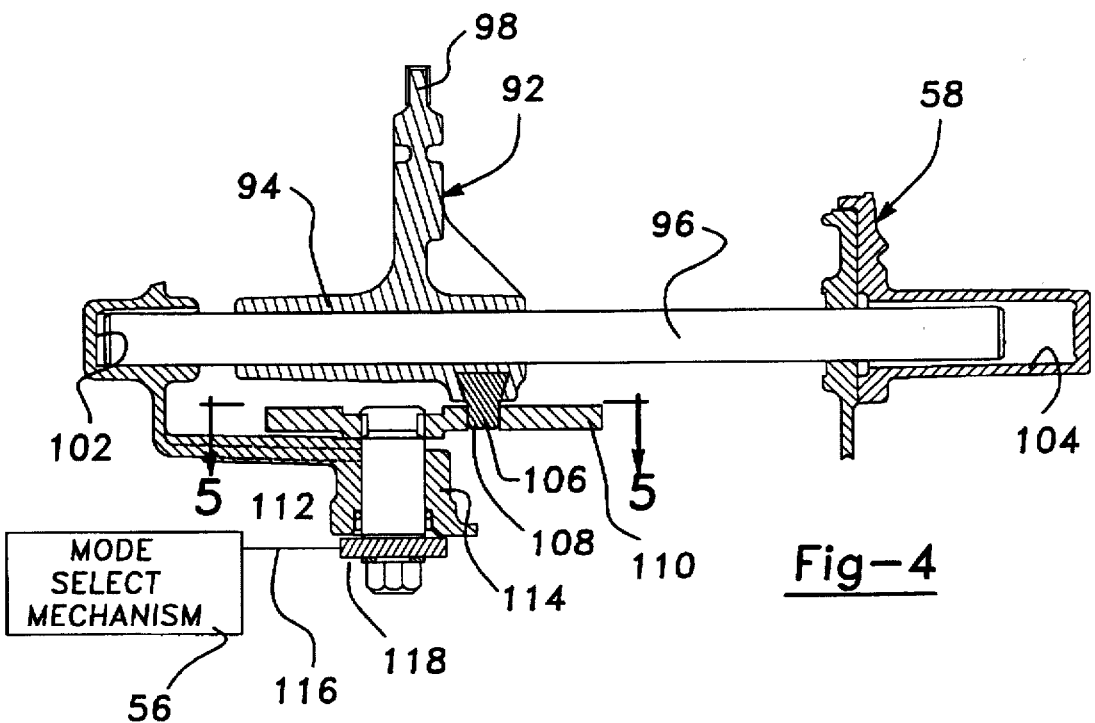
FIG. 4 is another enlarged fragmentary sectional view of FIG. 2 showing the components of the range shift mechanism in greater detail.

To provide means for selectively coupling rear output shaft 42 to input shaft 44 or planetary gear reduction unit 46, range shift mechanism 48 includes a range sleeve 82 that is mounted via a splined connection 84 for rotation with and axial sliding movement on rear output shaft 42. Clutch teeth 86 are formed on range sleeve 82 for selective meshed engagement with clutch teeth 88 on input shaft 44 or with clutch teeth 90 on rear carrier ring 76. In FIG. 2, range sleeve 82 is shown located in its high-range position (denoted by construction line "H" in FIG. 3) such that its clutch teeth 86 are shown meshingly engaged with clutch teeth 88 on input shaft 44. With range sleeve 82 in its high-range position, rear output shaft 42 is rotatably driven by input shaft 44 at a direct speed ratio (i.e., 1:1) relative thereto, whereby a "high-range" drive mode is established. In FIG. 3, range sleeve 82 is shown in its low-range position (denoted by construction line "L") whereat its clutch teeth 86 are meshed with clutch teeth 90 on rear carrier ring 76. With range sleeve 82 in this position, rear output shaft 42 is driven at the reduced speed ratio (i.e., 0.37:1) relative to input shaft 44 for establishing a "low-range" drive mode. It will be noted that range sleeve 82 can also be moved to a neutral position (denoted by construction line "N") whereat its clutch teeth 86 are disengaged from clutch teeth 88 on input shaft 44 and clutch teeth 90 on carrier assembly 72. With range sleeve 92 in this position, no drive torque is transmitted from input shaft 44 to rear output shaft 42 so as to define a "neutral" non-driven mode that is particularly useful for towing of the vehicle.

To provide means for selectively moving range sleeve 82 between its above-noted positions, range shift mechanism 48 further includes a shift fork 92 having a tubular hub segment 94 secured to a shift rail 96 and bifurcated end segments 98 retained in an annular groove 100 formed in range sleeve 82. As best seen from FIG. 4, the opposite ends of shift rail 96 are retained in sockets 102 and 104 formed in housing 58 for sliding movement relative thereto. A range pin 106 extends outwardly from tubular hub segment 94 of shift fork 92 and is retained in a range slot 108 that is formed in a sector plate 110. An actuator shaft 112 is coupled to sector plate 110 and is journally supported in a socket 114 formed in housing 58. Due to the profile of range slot 108, the direction and magnitude of rotation of actuator shaft 112 and sector plate 110 causes a corresponding direction and amount of axial movement of shift fork 92 for moving range sleeve 82 between its three distinct positions. In the particular embodiment shown, range actuator 54 is a mechanical linkage arrangement, diagrammatically identified by leadline 116, and having a lever assembly 118 that is fixed to actuator shaft 112 for causing rotation thereof in response to manipulation of mode select mechanism 56 by the vehicle operator. In some vehicular applications, mode select mechanism 56 is a manually-operable shift lever that is operably connected by mechanical linkage arrangement 116 to lever assembly 118. Alternatively, it is contemplated that mode select mechanism 56 could consist of suitable switches or push buttons that can be actuated by the vehicle operator for sending an electric signal to a power-operated type of range actuator 54, such as an electric gearmotor, for causing the desired rotation of sector plate 110 and the resulting axial movement of range sleeve 82.

Figure 5:
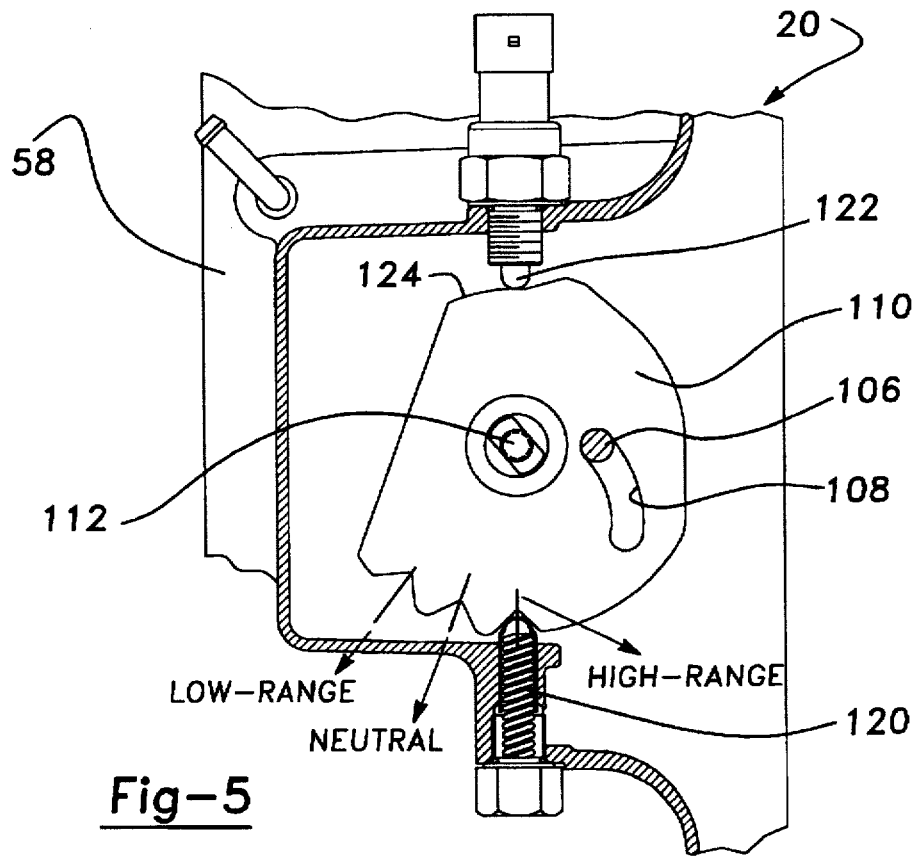
FIG. 5 is another partial sectional view taken along line 5—5 of FIG. 4 showing the sector plate associated with the range shift mechanism.

Referring to FIG. 5, a spring-biased poppet assembly 120 is provided for engagement within a specific detent formed in sector plate 110 that corresponds to a desired position of range sleeve 82. In particular, the detents are respectively identified as high-range, neutral, and low-range for illustrating the rotated position of sector plate 110 required to positively locate range sleeve 82 in its corresponding position relative to either of input shaft 44 or planetary gear reduction unit 46. A plunger-type switch 122 is arranged to contact an outer surface 124 of sector plate 110 and is adapted to be actuated in response to rotation thereof for signalling the position of range sleeve 82 and illuminating a lamp-type indicator provided within the passenger compartment of the motor vehicle to provide the vehicle operator with a visual indication of the current drive mode.

With particular reference to FIGS. 2 and 3, the chain drive arrangement is shown for transmitting drive torque from rear output shaft 42 to front output shaft 32. In particular, a drive sprocket 128 is shown coupled via a splined connection 130 to a drive hub 132 which, in turn, is rotatably supported by a bearing assembly 134 on an intermediate portion of rear output shaft 42. A retaining ring 136 retains drive sprocket 128 against a radial flange segment 138 of drive hub 132. A driven sprocket 140 is shown fixed by a splined connection 142 to front output shaft 32 which is shown rotatably supported by bearing assemblies 144 and 146 in housing 58. A continuous chain 148 is meshed with drive sprocket 128 and driven sprocket 140 for rotatably driving front output shaft 32 in response to driven rotation of drive hub 132.

As best seen from FIGS. 2 and 3, lock-out mechanism 50 is operably installed between range sleeve 82 and drive hub 132. Lock-out mechanism 50 includes a dog-type locking sleeve 150 which is mounted via splined connection 152 for rotation with and axial sliding movement on rear output shaft 42. A biasing spring 154 is concentrically mounted on rear output shift 42 and is retained between locking sleeve 150 and a retainer flange 156 extending radially from rear output shaft 42. Biasing spring 154 is preloaded for maintaining engagement of locking sleeve 150 with range sleeve 82. With range sleeve 82 in either of its high-range or neutral positions, external clutch teeth 158 on locking sleeve 150 are disengaged from internal clutch teeth 160 formed on an annular flange segment 162 of drive hub 132, whereby drive hub 132 and front output shaft 32 and free to rotate relative to rear output shaft 42 such that any torque transfer therebetween is generated by actuation of hydraulic coupling 52. In contrast, movement of range sleeve 82 toward its low-range position causes concurrent rearward sliding movement of locking sleeve 150 which compresses biasing spring 154 and results in engagement of locking sleeve clutch teeth 158 with clutch teeth 160 on drive hub 132. In this manner, front output shaft 32 is rigidly coupled for direct rotation with rear output shaft 42 for establishing a "part-time" four-wheel drive mode. Thus, transfer case 20 is designed to allow the vehicle operator to select operation in a part-time four-wheel low-range drive mode in addition to a neutral mode and an on-demand four-wheel high-range drive mode, as will be detailed more thoroughly hereinafter. The spacing, profile and number of clutch teeth 160 on drive hub 132 and clutch teeth 158 on locking sleeve 150 are selected to facilitate smooth meshed engagement therebetween so as to avoid tooth butting.

With particular reference now to FIGS. 2 and 6 through 10, hydraulic coupling 52 will now be described. In general, hydraulic coupling 52 includes a hydraulic pump 164 and a transfer clutch 166 that are operably arranged to automatically and progressively transfer drive torque from rear output shaft 42 to drive hub 132 and front output shaft 32 in response to rotational speed differences therebetween. Preferably, hydraulic pump 164 is a gerotor pump and transfer clutch 166 is a hydraulically-actuated multi-plate clutch assembly, both of which are confined within a common cover assembly 168. Cover assembly 168 includes a cylindrical outer drum 170 and a pair of front and rear cover plates 172 and 174, respectively, secured (i.e., welded) thereto. Front cover plate 172 is shown fixed via a splined connection 176 to drive hub 132 such that cover assembly 168 drives or is driven by front output shaft 32. Likewise, rear cover plate 174 is shown to include an O-ring seal 178 for permitting cover assembly 168 to rotate relative to rear output shaft 42 while providing a fluid-tight seal therebetween.

Transfer clutch 166 includes a clutch hub 180 fixed via a splined connection 182 to rear output shaft 42, and an interleaved clutch pack 184 comprised of a plurality of inner clutch plates 186 fixed via splined connection 188 to clutch hub 180 and which are alternately interleaved with a plurality of outer clutch plates 190 fixed via a splined connection 192 to outer drum 170. Lubrication ports 194 and 196 formed through clutch hub 180 and outer drum 170, respectively, are provided for supplying an adequate supply of lubricating fluid to clutch pack 184. Transfer clutch 166 further includes a piston assembly 198 comprised of a piston housing 200 that is fixed via a splined connection 202 for rotation with outer drum 172, and a piston 204 disposed in an annular pressure chamber 206 formed in piston housing 200. Preferably, piston 204 has a cover material 209 bonded thereto, such as rubber, to provide a sealed sliding engagement with the inner and outer edge surfaces of pressure chamber 206. Thus, piston 204 is supported for axial sliding movement within pressure chamber 206 relative to interleaved multi-plate clutch pack 184 for applying a compressive clutch engagement force on clutch pack 184, thereby transferring drive torque "on-demand" from rear output shaft 42 (via clutch hub 180) to front output shaft 32 (via cover assembly 168 and drive hub 132). The amount of drive torque transferred is progressive in that it is proportional to the magnitude of the clutch engagement force exerted by piston 204 on clutch pack 184 which, in turn, is a function of the fluid pressure within pressure chamber 206. Moreover, the magnitude of the fluid pressure in pressure chamber 206 delivered thereto by hydraulic pump 164 is largely a function of the speed differential between front output shaft 32 and rear output shaft 42.

Figure 6:
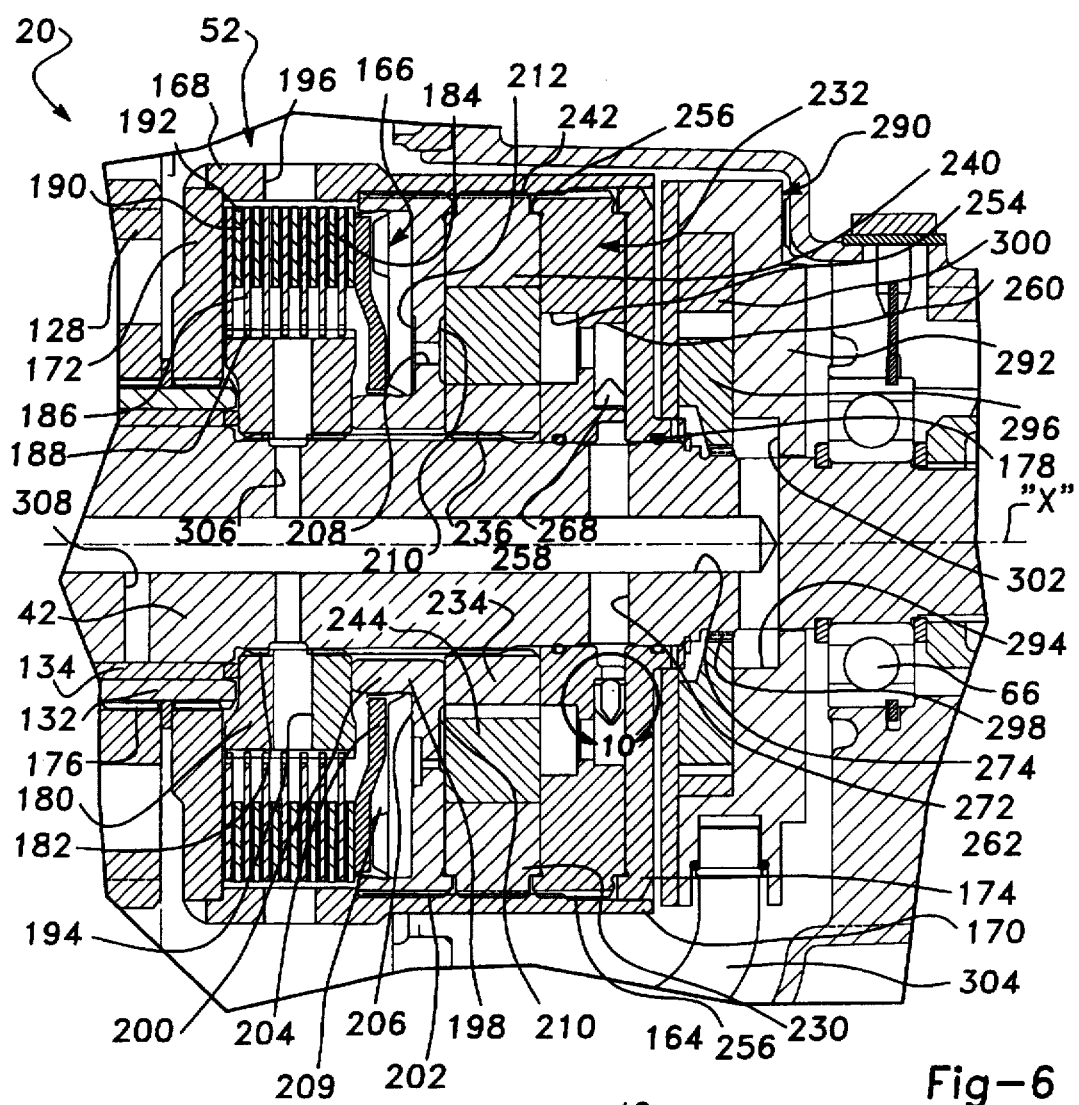
FIG. 6 is yet another enlarged fragmentary view of FIG. 2 showing the components of the on-demand hydraulic coupling in greater detail.
Figure 10:
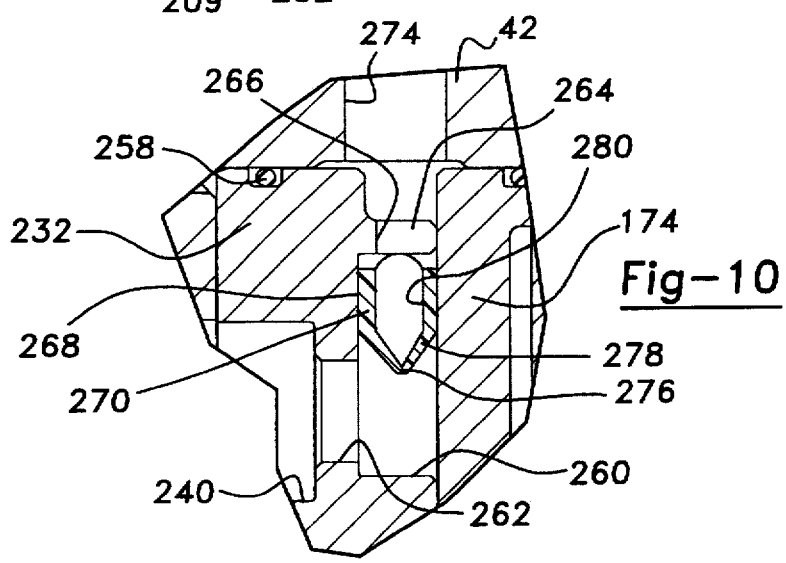
FIG. 10 is a fragmentary enlarged view of FIG. 6.
Figure 7:
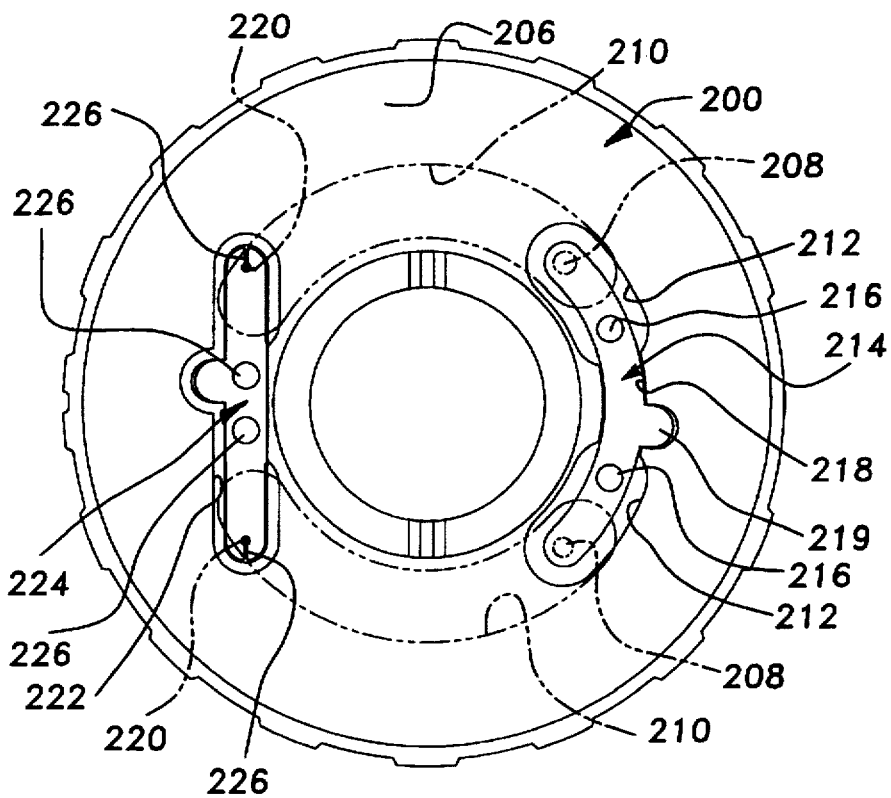
FIG. 7 is an end view showing the piston housing associated with the hydraulic coupling.

With particular reference now to FIGS. 6 and 7, piston housing 200 is shown to have a valving arrangement associated therewith that is operable for controlling the delivery of fluid under pressure to pressure chamber 206. In particular, piston housing 200 includes a pair of transfer ports 208 each extending between and communicating with an elongated pump outlet slot 210 and a piston inlet slot 212. In addition, a check valve 214 is mounted by rivets 216 in a shallow bridge groove 218 which communicates with both piston inlet slots 212. Preferably, check valve 214 is an elongated metallic reed valve element that is symmetrical relative to a central alignment tab 219. Based on the direction of relative rotation between the output shafts (which results in a corresponding directional rotation of hydraulic pump 164), one terminal end of reed valve 214 will resiliently deflect to an "open" position away from piston housing 200 and its corresponding transfer port 208 due to the pumping action of hydraulic pump 164 for permitting the flow of pumped hydraulic fluid into pressure chamber 206. Concurrently, the other terminal end of reed valve 214 is maintained in a "closed" position relative to piston housing 200 for inhibiting the discharge of hydraulic fluid from the other of transfer ports 208. As such, the hydraulic fluid in pressure chamber 206, if it exceeds a predetermined pressure level, will actuate transfer clutch 166 by moving piston 204 toward clutch pack 184 for applying the resultant clutch engagement force thereon. During the opposite direction of relative rotation between the output shafts, the open and closed positions mentioned above are reversed for each transfer ports 208. Upon cessation of the pumping action, both terminal ends of check valve 214 are biased to return to their respective closed positions for maintaining a supply of fluid in pressure chamber 206. Thus, reed valve 214 functions as a normally-closed check valve.

As best seen from FIG. 7, piston housing 200 includes a pair of outlet ports 220 each of which communicates with one of pump outlet slots 210 and a chamfered bridge slot 222. The valving arrangement associated with piston housing further includes a control valve 224 mounted by rivets 226 within bridge slot 222 and which is operable for setting the predetermined pressure level within pressure chamber 206 at which transfer clutch 166 is initially actuated and for compensating for temperature gradients caused during heating of the hydraulic fluid. Specifically, control valve 224 is of the bimetallic type that is normally maintained with both of its terminal ends in an "open" position displaced from piston housing 200 for permitting outlet flow from pressure chamber 206 through outlet ports 220. The fluid discharged from pressure chamber 206 through outlet ports 220 is delivered to a lower pressure section of pump 164. Since control valve 224 is of the bimetallic type, it is caused to move as its temperature is varied for controlling flow through outlet ports 220 until the fluid in pressure chamber 206 reaches the predetermined fluid pressure regardless of changes in the viscosity of the hydraulic fluid due to temperature variations. Upon the fluid in pressure chamber 206 reaching this predetermined level, each terminal end of control valve 224 moves to its "closed" position against piston housing 200 for inhibiting fluid flow through outlet ports 220. As is also seen, the terminal ends of control valve 224 have small bleed passages or slots 226 formed therein that permit a small amount of bleed flow even when control valve 224 is closed. The relationship between the size of transfer posts 208, outlet ports 220 and bleed slots 226, in conjunction with the operational characteristics of control valve 224 and check valve 214, can be selected to "tune" at which value of speed differential that torque transfer will begin (i.e., when the clamping force on clutch pack 184 is of a magnitude to transfer torque) as well as the characteristics of such torque transfer due to changes in the speed differential.

Figure 8:
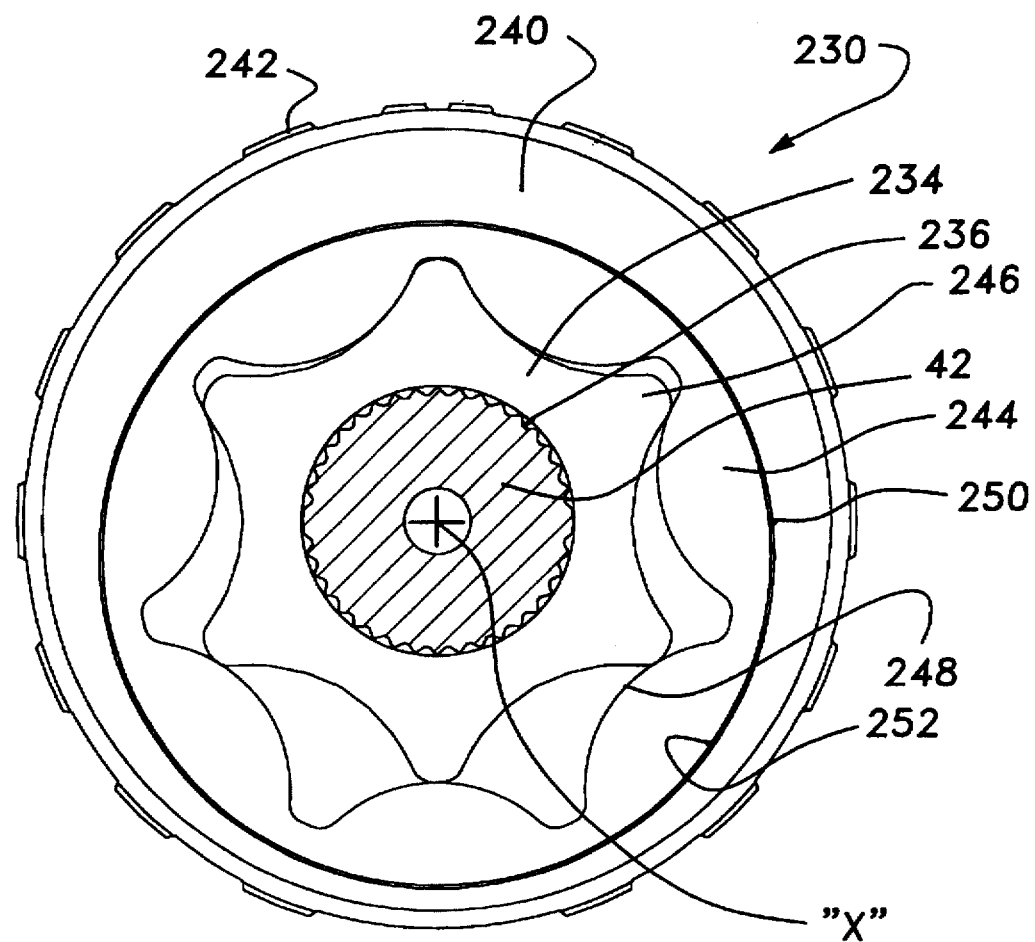
FIG. 8 is a sectional view taken through the hydraulic coupling showing the components of the hydraulic pump in greater detail.

As noted, hydraulic pump 164 is operable for pumping hydraulic fluid through transfer ports 208 and into pressure chamber 206 for actuating transfer clutch 166. Referring to FIGS. 6 and 8, hydraulic pump 164 is shown to include a gerotor pump assembly 230 and a pump housing 232. Gerotor pump assembly 230 is a three component arrangement including a pump ring 234 that is fixed via a splined connection 238 to rear output shaft 42, an eccentric ring 240 that is fixed via a splined connection 242 to outer drum 172, and a stator ring 244 that is operably disposed therebetween. More specifically, pump ring 234 has a plurality of external teeth 246 that rotate concentrically relative to rear output shaft 42 about a common rotational axis, as denoted by axis line "X". Stator ring 244 includes a plurality of internal lobes 248 and has an outer circumferential edge surface 250 that is journally rotatably supported within a circular internal bore 252 formed in eccentric ring 240. Internal bore 252 is offset from the rotational axis "X" such that, due to meshing of internal lobes 248 of stator ring 244 with external teeth 246 of pump ring 234, relative rotation between pump ring 234 and eccentric ring 240 causes eccentric rotation of stator ring 244. This eccentric rotary arrangement results in a pumping action for supplying fluid under pressure from pump inlet slots 254 formed in pump housing 232 to pump outlet slots 210 and transfer ports 208 formed in piston housing 200. Preferably, stator ring 244 has a number of lobes 248 that is one more than the number of teeth 246 provided on pump ring 234. However, while any suitable tooth combination can be used, it is currently contemplated that pump ring 234 has six teeth 246 and stator ring 244 has seven lobes 248.

Figure 9:
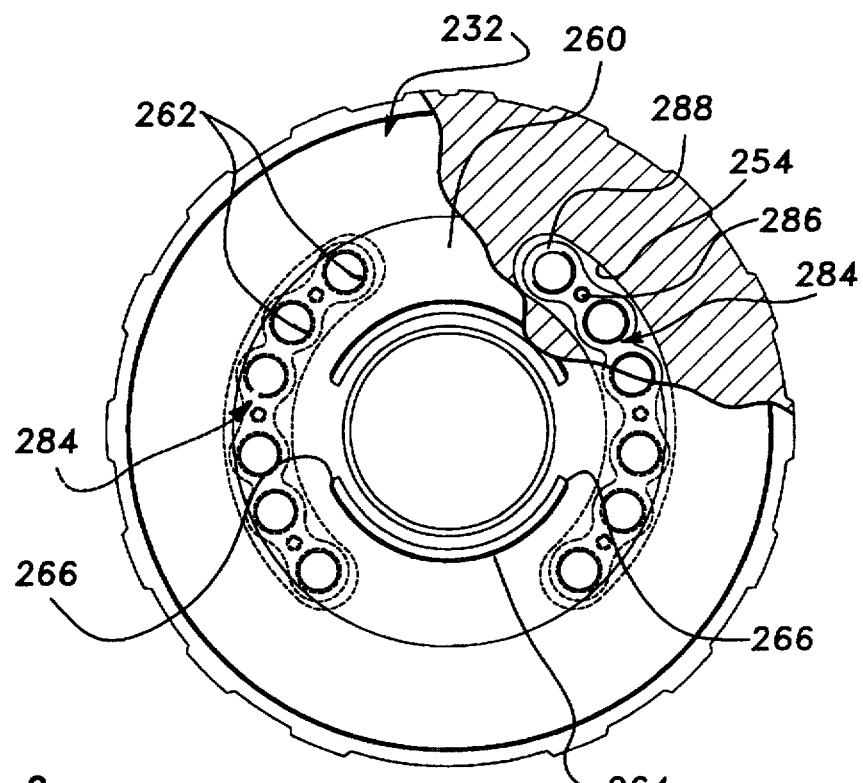
FIG. 9 is an end view, partially broken away, showing the pump housing associated with the hydraulic coupling.

Referring primarily to FIGS. 6 and 9, gerotor pump assembly 230 is shown operably installed between piston housing 196 and pump housing 232. Pump housing 232 is likewise shown to have its outer peripheral surface fixed via a splined connection 256 for rotation with outer drum 172 while its inner peripheral surface is journally supported for relative rotation with respect to rear output shaft 42 and is sealed relative thereto by an O-ring seal 258. Pump housing 232 is formed to include a pair of elongated pump inlet slots 254, an annular supply chamber 260, and a series of inlet ports 262 formed within each of pump inlet slots 254 to provide fluid communication with supply chamber 260. An annular flange 264 defines the inner border of supply chamber 260 and includes a pair of diametrically-opposed openings 266. An O-ring seal 268 is mounted on flanges 264 to provide a seal between supply chamber 260 and rear cover plate 174 of cover assembly 168. O-ring seal 268 is shown to have a generally triangular-shaped cross-section. In addition, O-ring seal 268 is formed to integrally include a pair of hollow valve segments 270 that are aligned with openings 266 to provide an inlet to supply chamber 260 for fluid supplied thereto through radial bores 272 formed in rear output shaft 42. As will be detailed, an internal supply pump is provided within transfer case 20 for supplying hydraulic pressure to radial bores 272 via a central axial bore 274 formed in rear output shaft 42.

To provide a means for controlling uni-directional flow into supply chamber 260, each valve segment 270 has an integral check valve associated therewith. As seen from FIG. 10, a slot 276 is formed between the converging frusto-conical side walls 278 of each valve segment 270. Side walls 278 are designed to resiliently deflect outwardly in response to fluid being supplied to an internal chamber 280 formed in each hollow valve segment 270 for opening slot 276 and thus allowing fluid to flow into supply chamber 260. Once the pressure in supply chamber 260 is equal to or greater than the fluid pressure delivered to internal chamber 280 in each valve segment 270, side walls 278 return to position shown for closing slot 276 and thereby maintain a supply of fluid in supply chamber 260. Thus, O-ring seal 268 provides the dual function of a seal member and as a one-way check valve.

With particular reference now to FIGS. 6 and 8, pump housing 232 is shown to include a valving arrangement for controlling the delivery of fluid under pressure from supply chamber 260 into pump inlet slots 254. In particular, pump housing 232 includes a pair of check valves 284 mounted by rivets 286 within pump inlet slots 254. Preferably, each check valve 284 is an elongated metallic reed valve element having enlarged segments 288 which are oriented to overlie each inlet port 262 for controlling flow therethrough. Each check valve 284 is adapted to slide axially on rivets 286 from a "closed" position relative to pump housing 232 to an "open" position away from pump housing 232 in response to the pumping action of hydraulic pump 164 which causes the hydraulic pressure within supply chamber 260 to exceed that within pump inlet slots 254. Upon cessation of the pumping action, check valves 284 are adapted to return to their respective closed positions for maintaining a supply of fluid within supply chamber 260.

As noted, transfer case 20 is equipped with an internal supply pump 290 for supplying hydraulic pressure to radial bores 272 via central axial bores 274 in rear output shaft 42. As best seen from FIG. 6, supply pump 290 is gerotor pump which includes: a pump housing 292 mounted to housing 58 and which defines a pump chamber 294; a pump ring 296 fixed via a splined connection 298 for concurrent rotation with rear output shaft 42; and an eccentric ring 300 fixed to pump housing 292. Pump ring 296 has a predetermined number of external teeth that mesh with internal lobes formed in eccentric ring 300 for delivering fluid under pressure to radial outlet ports 302 which communicate with axial bore 274. An inlet to pump chamber 302 is supplied with hydraulic fluid from a sump area within transfer case 20 via a supply tube 304. As is also seen, axial bore 274 also provides fluid to radial bores 306 aligned with clutch hub 180, radial bores 308 aligned with drive hub 132, and radial bores aligned with sun gear 68 for providing lubricating fluid to the outer peripheral surface of rear output shaft 42. Thus, supply pump 290 is a shaft driven device that generates fluid pressure in response to rotation of rear output shaft 42 for constantly providing lubricating fluid to various components mounted on rear output shaft 42 while delivering pressurized fluid to hydraulic coupling 52 when required to supply fluid to hydraulic pump 164.

As noted, mode select mechanism 56 permits the vehicle operator to selectively shift transfer case 20 into one of three different modes of operation. Specifically, the on-demand four-wheel high-range drive mode is established with range sleeve 82 in its high-range position and hydraulic coupling 52 transfers drive torque automatically to front output shaft 32 when a predetermined amount of interaxle slip occurs. This predetermined amount of slip can be selected via tuning of the valving arrangement to initiate torque transfer when the magnitude of the interaxle speed differential is greater than that associated with normal turning of the vehicle. Moreover, the on-demand torque transfer characteristics of hydraulic coupling 52 can be tuned to suit virtually any desired application for highway and off-road use.

When mode select mechanism 56 is actuated to shift transfer case 20 into the neutral mode, range sleeve 82 is moved to its neutral position whereat rear output shaft 42 is decoupled from input shaft 44 to permit flat towing of the motor vehicle. Finally, the part-time four-wheel low-range drive mode is established when range sleeve 82 is moved to its low-range position and locking sleeve 150 is concurrently moved into coupled engagement With drive hub 132. As such, front output shaft 32 is coupled for direct rotation with rear output shaft 42 at the reduced speed ratio. Moreover, since cover assembly 168 is coupled for direct rotation with drive hub and clutch hub 180 is coupled for direct rotation with rear output shaft 42 there can be no relative rotation therebetween. Likewise, there is no relative rotation between eccentric ring 240 and pump ring 234 such that no pumping action can occur. As such, hydraulic coupling 52 is locked-out when transfer case 20 is operating in the part-time four-wheel low-range drive mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transfer case for use in a motor vehicle having a power source and front and rear drivelines comprising:

an input shaft adapted to be driven by the power source;

a rear output shaft adapted to drive the rear driveline;

a front output shaft adapted to drive the front driveline;

a gear reduction unit driven by said input shaft at a reduced speed ratio relative thereto;

a range sleeve coupled for rotation with said rear output shaft and movement thereon between a first position whereat said rear output shaft is coupled for rotation with said input shaft at a direct speed ratio relative thereto and a second position whereat said rear output shaft is coupled to said gear reduction unit for rotation therewith at said reduced speed ratio;

a drive hub rotatably supported on said rear output shaft;

a drive mechanism interconnecting said front output shaft for rotation with said drive hub;

a locking sleeve coupled for rotation with said rear output shaft and movement thereon between a released position uncoupled from said drive hub and a locked position coupled to said drive hub, said locking sleeve being movable from said released position to said locked position in response to movement of said range sleeve from said first position to said second position;

a biasing spring for normally biasing said locking sleeve toward said released position;

a hydraulic coupling operable for automatically transferring drive torque from said rear output shaft to said front output shaft in response to a speed differential therebetween exceeding a predetermined threshold value, said hydraulic coupling including an outer drum fixed for rotation with said drive hub, a clutch hub fixed for rotation with said rear output shaft, an outer clutch plate fixed for rotation with said outer drum, an inner clutch plate fixed for rotation with said clutch hub, a piston housing fixed for rotation with said outer drum and defining a pressure chamber and a transfer port in fluid communication with said pressure chamber, control valving mounted to said piston housing for controlling the delivery of fluid through said transfer port to said pressure chamber, a piston disposed in said pressure chamber for movement relative to said clutch plates for exerting a clutch engagement force thereon the magnitude of which is a function of the fluid pressure in said pressure chamber, and a hydraulic pump for delivering fluid under pressure to said pressure chamber through said transfer ports, said hydraulic pump including a pump ring fixed for rotation with said rear output shaft and having externally teeth formed thereon, an eccentric ring coupled for rotation with said outer drum and defining a internal bore that is offset from the rotational axis of said pump ring, and a stator ring mounted in said bore of said eccentric ring and having internal lobes in meshed engagement with said teeth on said pump ring such that relative rotation between said pump ring and said eccentric ring due to a speed differential between said front and rear output shafts results in a pumping action for delivering fluid under pressure to said transfer port, a pump housing fixed for rotation with said outer drum and defining a flow pathway for delivering fluid to said hydraulic pump, and a check valve operable for delivering hydraulic fluid to said hydraulic pump in response to said pumping action and inhibiting flow therefrom; and a supply pump driven by rotation of said rear output shaft for delivering fluid to said flow pathway in said pump housing.

2. The transfer case of claim 1 wherein said control valving is operable for pressurizing said pressure chamber for moving said piston to exert a clutch engagement force on said clutch plates when said speed differential exceeds said predetermined threshold value.

3. The transfer case of claim 2 wherein said fluid pressure in said pressure chamber is varied in proportion to changes in the value of said speed differential.

4. A hydraulic coupling for automatically transferring drive torque from a first shaft to a second shaft in response to a speed differential therebetween exceeding a predetermined threshold value, said hydraulic coupling comprising:

a clutch hub fixed for rotation with said first shaft;

a set of first clutch plates fixed for rotation with said clutch hub;

an outer drum fixed for rotation with said second shaft;

a set of second clutch plates fixed for rotation with said outer drum and interleaved with said first clutch plates;

a piston housing fixed for rotation with said outer drum and having a pressure chamber and a transfer port formed therein;

a piston disposed in said pressure chamber for movement relative to said interleaved clutch plates for exerting a clutch engagement force thereon due to the fluid pressure in said pressure chamber;

a hydraulic pump for delivering fluid under pressure to said pressure chamber through transfer port formed in said piston housing, said hydraulic pump including a pump ring fixed for rotation with said first shaft and having externally teeth formed thereon, an eccentric ring coupled for rotation with said outer drum and defining an internal bore that is offset from the rotational axis of said pump ring, and a stator ring mounted in said internal bore of said eccentric ring and having internal lobes meshingly engaged with said teeth of said pump ring such that relative rotation between said pump ring and said eccentric ring results in a pumping action for delivering fluid under pressure to said transfer port;

control valving mounted to said piston housing for controlling delivery of fluid through said transfer port into said pressure chamber;

a pump housing fixed for rotation with said outer drum and defining a flow pathway for delivering fluid to said hydraulic pump;

a check valve operable for permitting fluid to flow into said flow pathway and inhibit flow therefrom; and a supply pump driven by rotation of one of said first and second shafts for delivering fluid to said flow pathway in said pump housing.

\* \* \* \* \*